(12) United States Patent
Salomon

(10) Patent No.: US 9,435,671 B2
(45) Date of Patent: Sep. 6, 2016

(54) PARABOLOIDAL PERCUSSION INSTRUMENT

(71) Applicant: Gerhard Salomon, Schwabach (DE)

(72) Inventor: Gerhard Salomon, Schwabach (DE)

(73) Assignee: Gerhard Salomon, Schwabach Bavaria (DE)

( * ) Notice: Subject to any disclaimer, the term of this patent is extended or adjusted under 35 U.S.C. 154(b) by 2 days.

(21) Appl. No.: 14/402,596

(22) PCT Filed: Dec. 12, 2012

(86) PCT No.: PCT/EP2012/075191
§ 371 (c)(1),
(2) Date: Nov. 20, 2014

(87) PCT Pub. No.: WO2013/174459
PCT Pub. Date: Nov. 28, 2013

(65) Prior Publication Data
US 2015/0135932 A1  May 21, 2015

(30) Foreign Application Priority Data

May 20, 2012  (DE) .................. 10 2012 104 332

(51) Int. Cl.
*G10D 13/02* (2006.01)
*G01D 13/02* (2006.01)

(52) U.S. Cl.
CPC .......... *G01D 13/02* (2013.01); *Y10T 29/49574* (2015.01)

(58) Field of Classification Search
CPC .. G10D 13/026; G10D 13/02; G10D 13/021; G10D 13/00; G10D 13/027; G10D 13/028; G01G 5/00; H04R 1/08; H04R 1/1033; H04R 1/2834; H04R 2201/023
USPC ................................. 84/411 R, 421
See application file for complete search history.

(56) References Cited

U.S. PATENT DOCUMENTS

| 4,616,551 | A | 10/1986 | Bookvich |
| 7,282,633 | B1 | 10/2007 | Coolidge |
| 2006/0156898 | A1* | 7/2006 | Nickel ........................ 84/411 R |
| 2006/0272475 | A1 | 12/2006 | Gauthier |

FOREIGN PATENT DOCUMENTS

| DE | 102009008755 | 8/2010 |
| WO | 2009012503 | 1/2009 |

OTHER PUBLICATIONS

Kasin Hunter: "Drums by Kasin Hunter", Jun. 2001 see attached pages retrieved from the Internet: URL:http://kasinhunter.tripod.com/drums2001.*

(Continued)

*Primary Examiner* — Kimberly Lockett
(74) *Attorney, Agent, or Firm* — Brooks Kushman P.C.

(57) ABSTRACT

A percussion instrument, in the simplest case in the form of a djembe, having one or more interconnected resonators in the form of elliptical paraboloids, which meet at their focal points. At or near this common focal point, sound-receiving or sound-emitting devices may be additionally placed. An expedient embodiment provides that the resonators are of a form in which they can be dismantled. A possible method for producing a suitable form is provided by making rings out of plate material.

10 Claims, 10 Drawing Sheets

(56) References Cited

OTHER PUBLICATIONS

International Search Report for PCT/EP2012/075191, English translation attached to original, Both completed by the European Patent Office on Apr. 5, 2013, All together 7 Pages.

Website http://kasinhunter.tripod.com/drums2001Row1.html Kasin Hunter, Jun. 15, 2006, Retrieved Dec. 16, 2015, XP 055058609, Bibliographic Data attached to document, All together 4 Pages, "Drums by Kasin Hunter, 2001."

Website http://en.wikipedia.org/wiki/Hourglass_drum Wikipedia article May 13, 2011, Retrieved Dec. 16, 2015, XP 055058604, Bibliographic Data attcahed to document, All together 2 Pages. "Hourglass Drum."

Website https://www.djembedirect.com/about/djembe.html#history Djembe Direct May 12, 2012, Retrieved Dec. 16, 2015, XP 055058503, Bibliographic Data attached to document, All together 5 Pages, "About the Djembe Drum."

\* cited by examiner

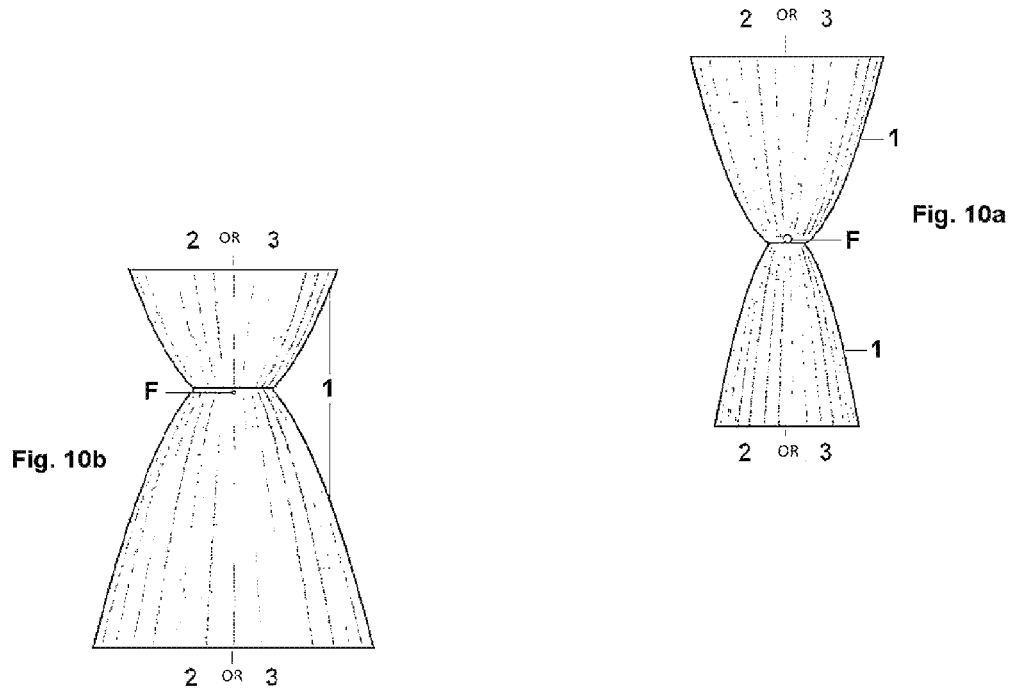
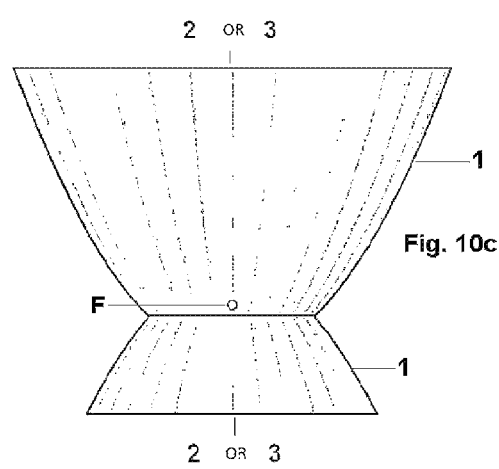
Fig. 10a
Fig. 10b
Fig. 10c

PARABOLOIDAL PERCUSSION INSTRUMENT

CROSS-REFERENCE TO RELATED APPLICATION

This application is the U.S. national phase of PCT Application No. PCT/EP2012/075191 filed on Dec. 12, 2012, which claims priority to German Patent Application No. 10 2012 104 332 filed on May 20, 2012, the disclosures of which are incorporated in their entirety by reference herein.

TECHNICAL FIELD

The invention relates to a percussion instrument, in the simplest case similar to the shape of a djembe, with one or more interconnected resonators in the form of elliptical paraboloids {1}, which meet at their focal points {F}.

BACKGROUND ART

In the prior art (see, for example DE 10 2009 008 755 A1) a drum in the form of a djembe usually comes with a skin membrane as drum face. The resonator has more or less the form of a bowl. The sound exit opening usually has a funnel-like or hyperboloid shape. Other drums have cylindrical shapes. With this new drum, the respective shape of the resonance body and the sound exit opening is defined by the form of an elliptical paraboloid. The playing surfaces can also be located on both ends, as is customary in many other drums.

DISCLOSURE

Technical Problem

The object of the invention is to create a percussion instrument with enhanced audio qualities.

Technical Solution

This object is achieved by an instrument with the features listed in claim 1.

An advantageous embodiment of the invention is indicated in claim 2. Several such paraboloids of different (or the same) size can be used. Common to them all is a single shared focal point {F}. The propagation of sound waves is precisely reflected by the paraboloidal design of the resonance body in such a way that they first get bundled to a single location in the focal point {F}. This sound source located in a single point is now the common sound source of the other paraboloids, since it is also their focal point. From there, the sound will be reflected into the other paraboloids. The striking surfaces {2} can be on only one opening of the resulting total body {1} or on several openings. The relative proportions of the individual resonator bodies are arbitrary. Preferably, however, harmonic acoustic ratio variations are preferred, since the resulting sound chambers mutually influence each other, as is also intended. Through this particular form, a completely new sound is possible.

The resonators can be made for example of metal, ceramic, wood, stone, glass, composites, fiberglass, acrylic or other suitable materials, which both reflect and inhibit sound. It is also possible to shape the resonance chambers out of a single block of contiguous material.

If open exits for the sound {3} are desired, their resonance bodies can also be located at an arbitrary angle to each other. Examples of this embodiment are to be seen in FIG. 3a, FIG. 3b and in FIG. 5. Thus, the resulting sound can be directed, for example, towards the audience or to an external sound recording device.

The striking surfaces {2} may be natural or artificial skins (animal skins, films, membranes etc.) or thin plates of any suitable material (metal, plastic, wood, etc.). The striking surfaces can be vibrated by hitting with the hand, by mechanical tools, or any other way and thus brought to the generation of sound.

Advantageous Effects

Additional Embodiments

Another embodiment of the invention is defined in claim 3. In the respective focal points, additional sound output devices in the form of small speakers {4} can be placed, which play sounds or music. Due to the special shape of this drum, these sounds can be modulated, by muting them or by striking the surface(s), which creates a very special sound effect. An example of this is given in FIG. 6, which shows a sectional illustration with a speaker {4} as a sound source at the focal point {F}.

As a further embodiment of the invention, small rattles, bells or vibrating parts are attached at or near the focal point {F}, because there they can be brought to resonate strongly, this being the point of the maximum concentration of sound. Thus they act as a sound source like a speaker {4}.

Another embodiment of the invention is the insertion of a microphone {5}, or any other sound receiving device, to lead out the sound waves produced there, either mechanically (tube, hose pipe) or electronically and, if applicable, perhaps pass them on to an amplifier or an effects unit. An example of this variant is shown as a sectional illustration with a microphone in FIG. 7.

A further advantageous embodiment of the invention is given in the patent claim 4. In a modification of the skin design this striking surface {2} can also be any other three-dimensional shape that can be formed for example by deep-drawn plastic or sheet metal. Among them might be, for example, but not exclusively, wave patterns or concave/convex surfaces. Some examples are shown in FIG. 11a and FIG. 11b.

A use without any additional equipment is the main but not exclusive primary use.

DESCRIPTION OF THE DRAWINGS

FIG. 10a to FIG. 10c: Shows several variants with two paraboloids {1} in different sizes, a face {2} and a sound exit opening {3}. This can also be designed as another face {2}. The common focal point is shown with {F}.

LIST OF REFERENCE NUMERALS

F focal point (focus)
1 sound resonating body
2 face (striking surface)
3 sound exit opening
4 loudspeaker, sound source
5 microphone

MODE FOR INVENTION

Figure 1:
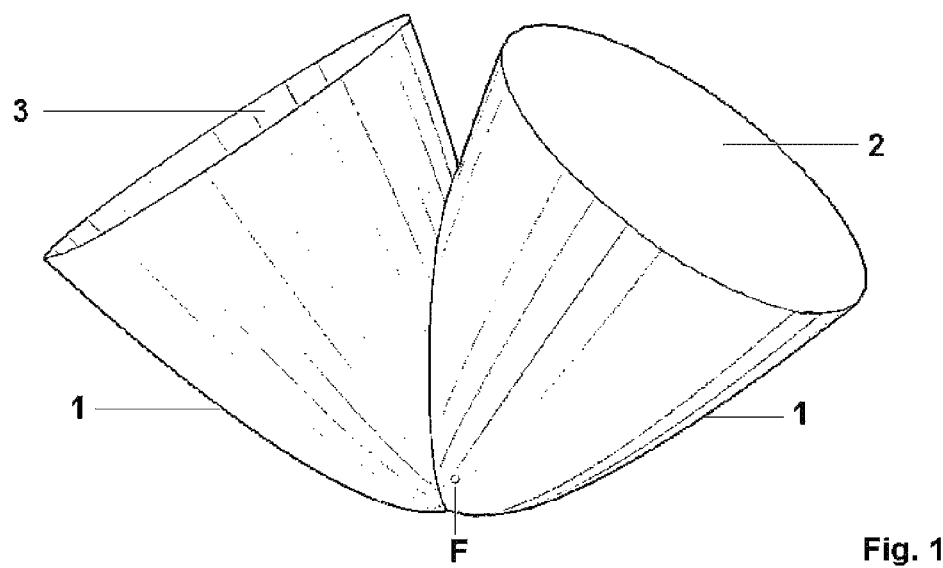
FIG. 1: shows an angled version with two paraboloids {1}, a face {2} and a sound exit opening {3} with the common focal point {F}.
Figure 2:
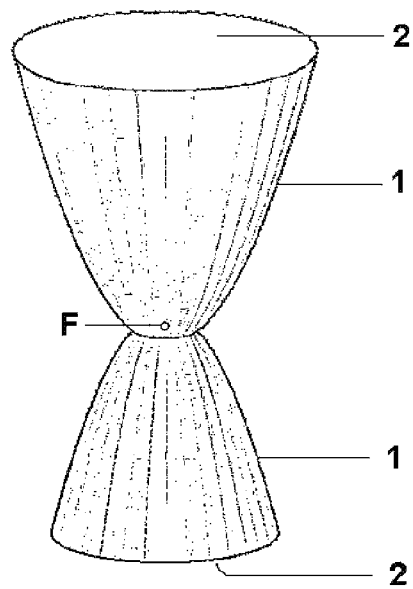
FIG. 2: Shows a variant with two paraboloids {1} of different size, a face {2} and a sound exit opening {3}. This can also be designed as another face {2}. The common focal point is shown with {F}.
Figure 3A:
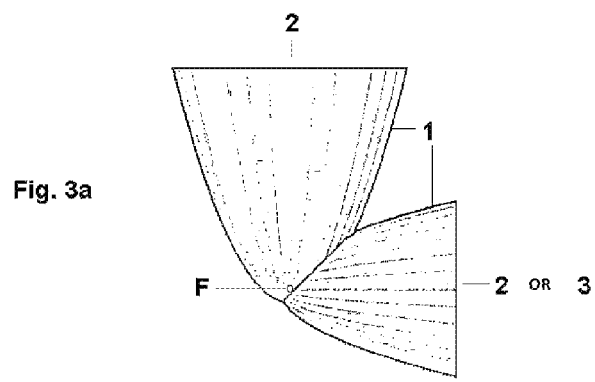
FIG. 3a and FIG. 3b: shows two angled versions with two paraboloids {1} of different size, a face {2} and a sound exit opening {3}. This can also be designed as another face {2}. The common focal point is shown with {F}.
Figure 3B:
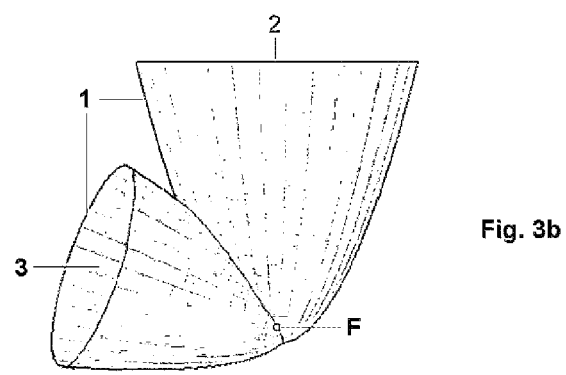
Figure 4:
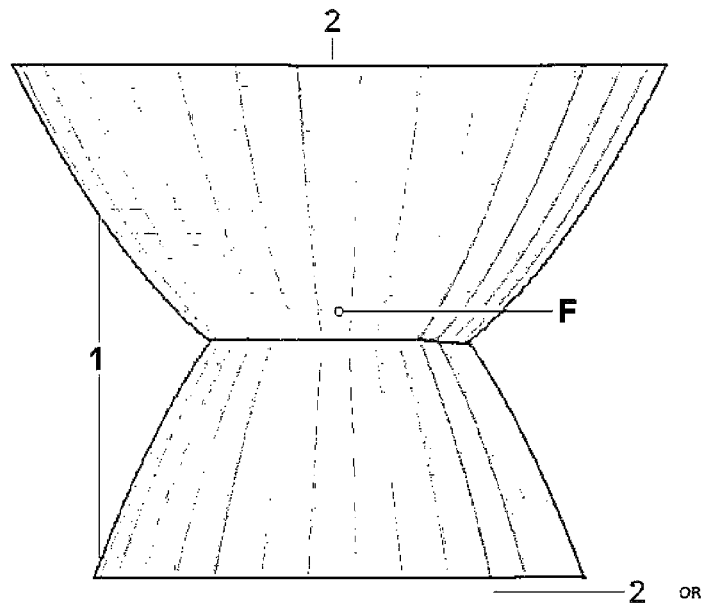
FIG. 4: Shows a variant with two paraboloids {1} of different size, a face {2} and a sound exit opening {3}. This can also be designed as another face {2}. The common focal point is shown with {F}.
Figure 5:
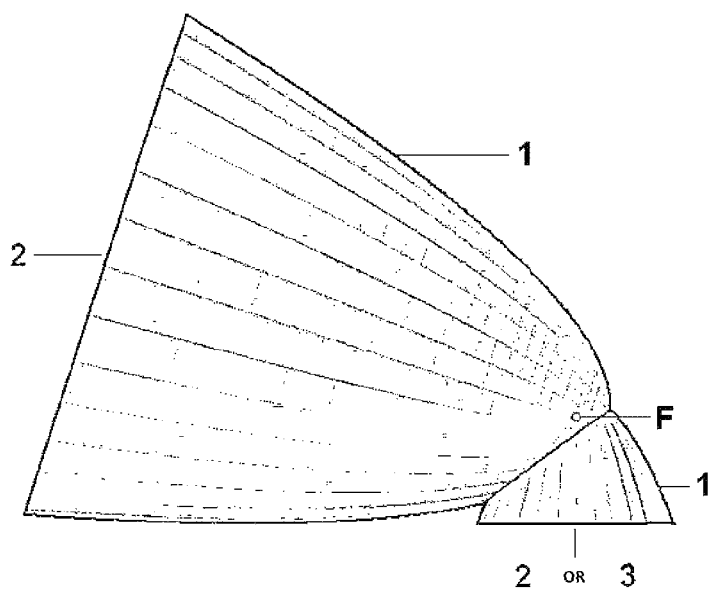
FIG. 5: shows a variant with two paraboloids {1} of different size, a face {2} and a sound exit opening {3}. This can also be designed as another face {2}. The common focal point is shown with {F}.
Figure 6:
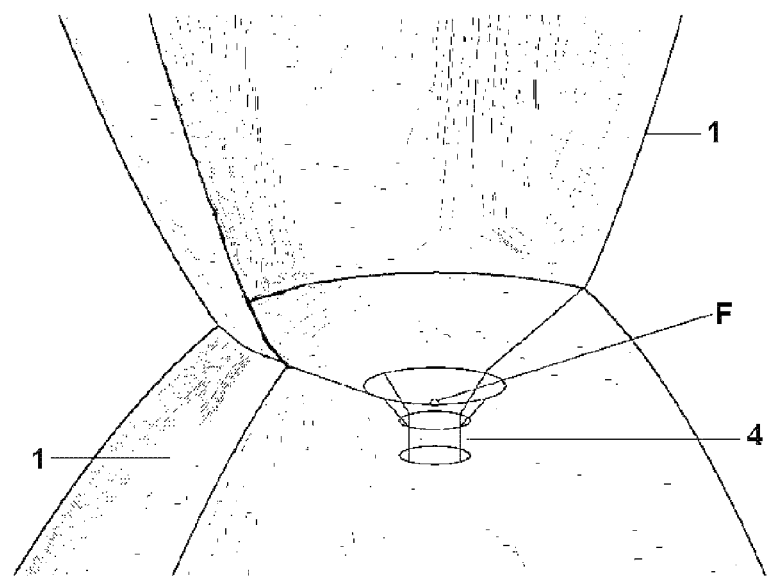
FIG. 6: Shows a section through a variant with two paraboloids {1} of different size, the common focal point {F} and a sound emitting device {4} mounted there.
Figure 7:
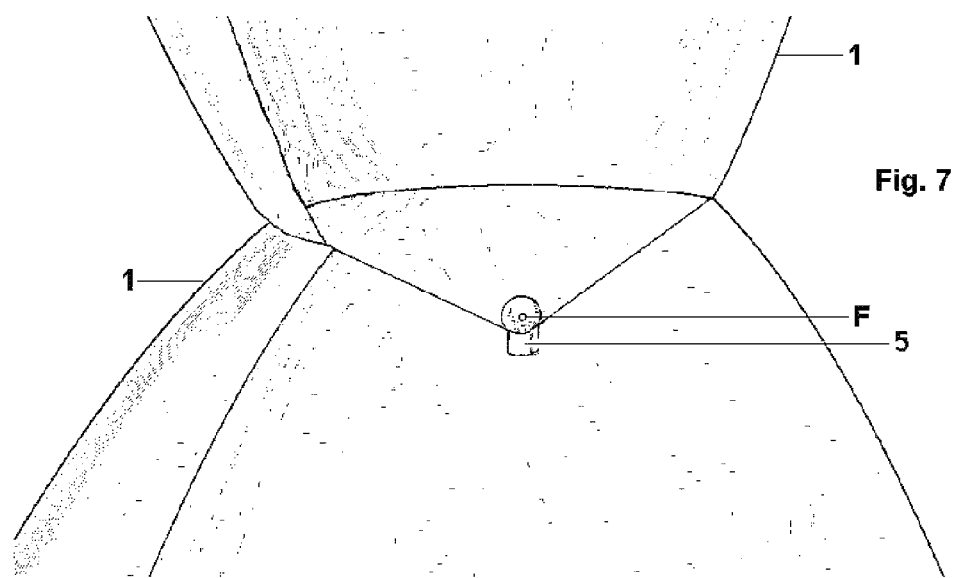
FIG. 7: Shows a section through a variant with two paraboloids {1} of different size, the common focal point {F} and a sound receiving device {5} attached there.
Figure 8A:
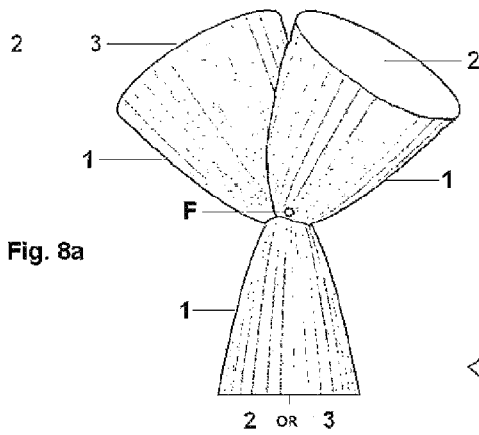
FIG. 8a to FIG. 8d: Shows several variants with three paraboloids {1} in different sizes, two playing surfaces {2} and a sound exit opening {3}. This can also be designed as another face {2}. The common focal point is shown with {F}.
Figure 8B:
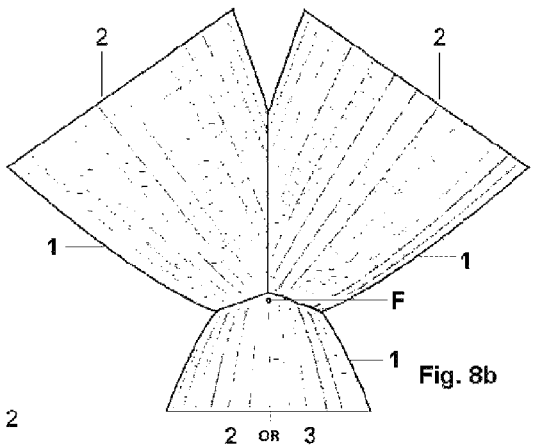
Figure 8C:
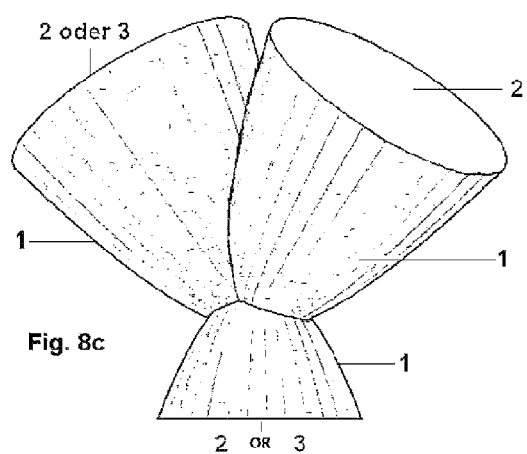
Figure 8D:
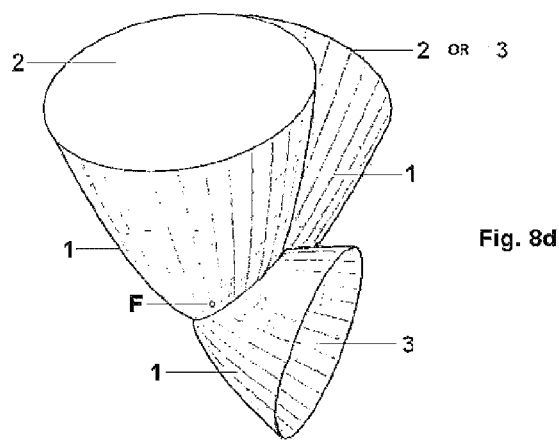
Figure 9A:
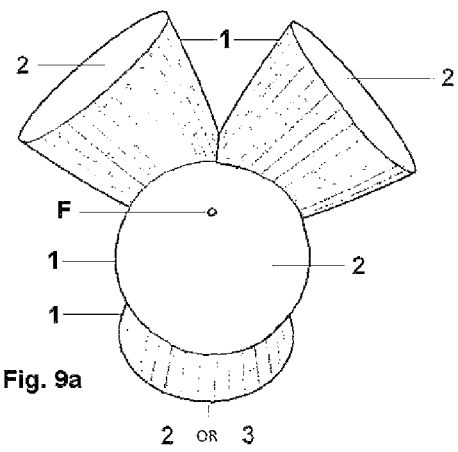
FIG. 9a to FIG. 9c: Shows several variants with four paraboloids {1} in different sizes, three playing surfaces {2} and a sound exit opening {3}. This can also be designed as another face {2}. The common focal point is shown with {F}.
Figure 9B:
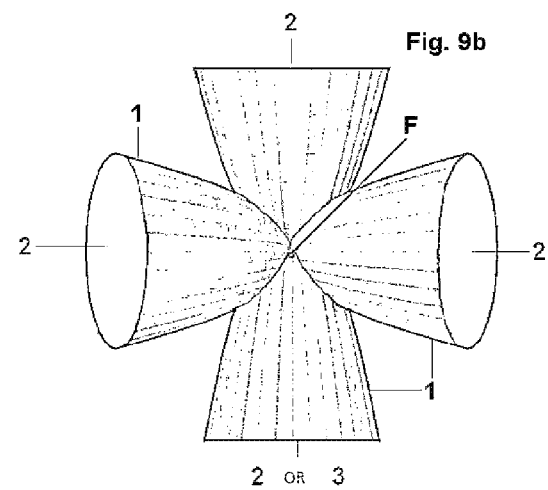
Figure 9C:
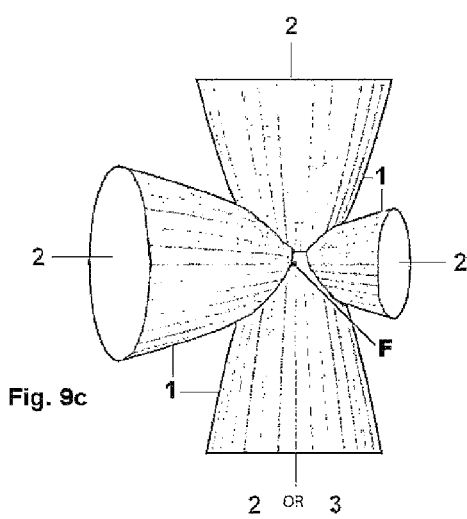
Figure 11A:
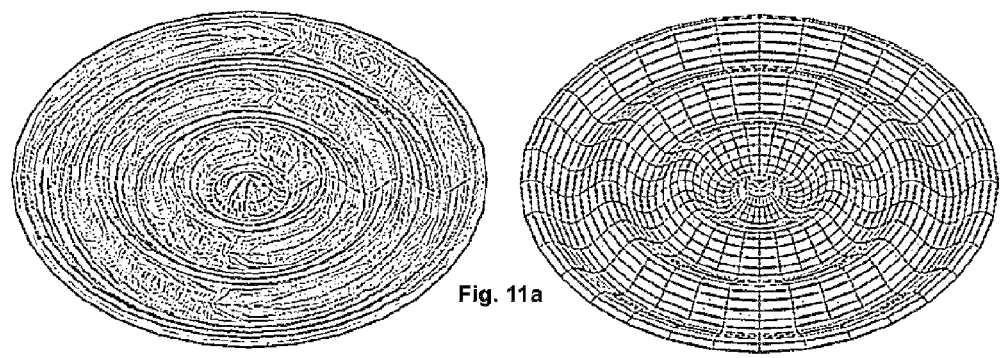
FIGS. 11a and 11b: Shows examples of various curved surfaces, which can also be used as a face {2}.
Figure 11B:
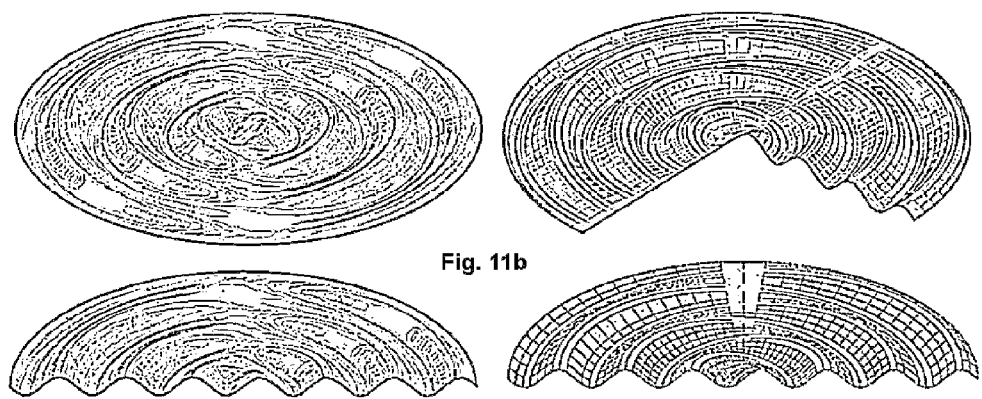
Figure 12A:
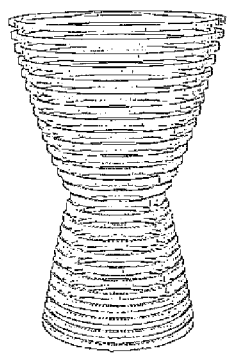
FIG. 12a: Shows an example of the individual rings of a possible method of production of a parabolidal sound chamber according to claim 5, these will then be joined together to build the final form as shown in FIG. 12b.
Figure 12B:
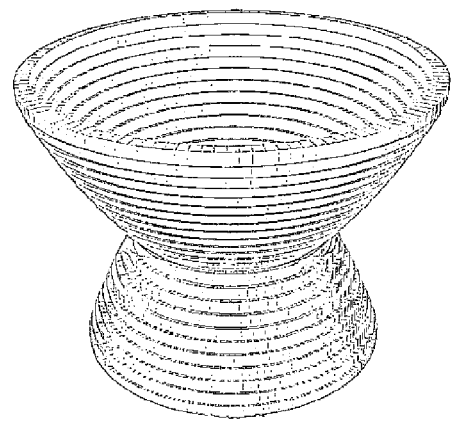

A possible method of manufacturing a percussion instrument according to one of claims 1 to 3 at suitable forms is provided by generating rings out of sheet material, with diameters adapted to the form of the intended paraboloid. After generating the rings, they are connected by joining them to the final shape. An illustration of this process is shown in FIG. 12a and FIG. 12b.

Figure 13A:
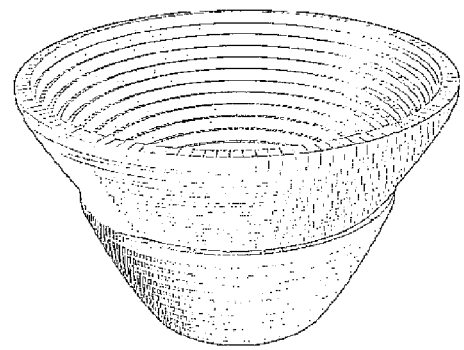
FIG. 13a shows how it can be put together to save space.
Figure 13B:
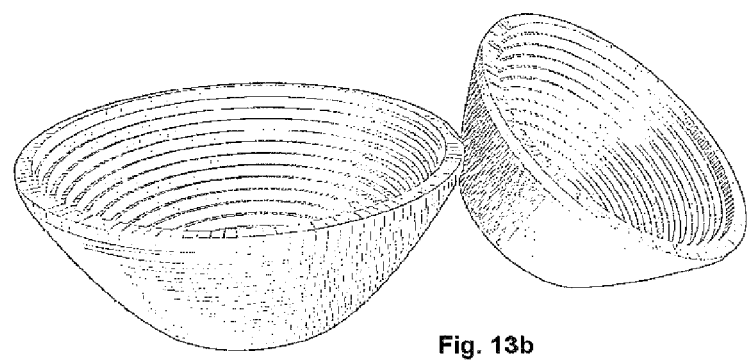
FIG. 13b: Shows an example of how one may take apart a dismantable version

With suitable forms it is advantageous for the purposes of transportation or storage, if the individual sound bodies {1} are made separable. By the similarity in shape of the paraboloids they can be inserted into each other, so that less space is required. An illustration is shown in FIG. 13a and FIG. 13b. The sound bodies can then, if they have a striking face {2} be played separately as a stand-alone instrument. The attachment of various pieces of equipment according to claim 3 is thereby also made easier.

The invention claimed is:

1. A percussion instrument comprising:
    a plurality of hollow interconnected resonating bodies having least one face, wherein the resonant bodies have an inner side surfaces forming elliptical paraboloids, the elliptical paraboloids having focal points which coincide.

2. The percussion instrument of claim 1, wherein the paraboloids have different sizes.

3. The percussion instrument of claim 1, further comprising a sound receiving or sound emitting device placed at the common focal point.

4. The percussion instrument of claim 1, wherein the face is a spatially profiled surface.

5. A method for manufacturing a percussion instrument having a plurality of hollow interconnected resonating bodies having least one face, wherein the resonant bodies have an inner side surfaces forming elliptical paraboloids, the elliptical paraboloids having focal points which coincide, the method comprising the steps of:
    generating a plurality of rings of plate material with varying diameters which stacked form a plurality of elliptical paraboloid shape; and
    assembling of the plurality of rings and joining the rings together to form a plurality of elliptical paraboloid shaped resonating bodies.

6. The percussion instrument according to claim 1, wherein the resonance bodies are dismantleable.

7. The method for manufacturing a percussion instrument according to claim 5, wherein the paraboloids have different sizes.

8. The method for manufacturing a percussion instrument according to claim 5, wherein a sound receiving or sound emitting device is placed at the common focal point.

9. The percussion instrument according to claim 2, wherein the resonance bodies are dismantleable.

10. The percussion instrument according to claim 3, wherein the resonance bodies are dismantleable.

* * * * *